United States Patent [19]
Kennedy et al.

[11] Patent Number: 5,730,871
[45] Date of Patent: Mar. 24, 1998

[54] DOWNHOLE FLUID SEPARATION SYSTEM

[75] Inventors: Steven C. Kennedy; Lawrence C. Lee; Mike E. Nodine; Richard B. Kroeber, all of Bartlesville, Okla.

[73] Assignee: Camco International, Inc., Houston, Tex.

[21] Appl. No.: 657,225

[22] Filed: Jun. 3, 1996

[51] Int. Cl.$^6$ ..................................................... B01D 21/26
[52] U.S. Cl. ........................ 210/512.2; 210/512.1; 210/170; 210/416.5; 166/265
[58] Field of Search ........................ 166/265; 210/512.1, 210/512.2, 170, 416.1, 416.5

[56] References Cited

U.S. PATENT DOCUMENTS

| | | | |
|---|---|---|---|
| 4,241,787 | 12/1980 | Price | 166/105 |
| 4,673,338 | 6/1987 | Jones | 417/435 |
| 5,296,153 | 3/1994 | Peachey . | |
| 5,456,837 | 10/1995 | Peachey . | |
| 5,482,117 | 1/1996 | Kolpak et al. | 166/265 |

FOREIGN PATENT DOCUMENTS

| | | |
|---|---|---|
| 2 194 575 | 3/1988 | United Kingdom . |
| WO/94/13930 | 6/1994 | WIPO . |

OTHER PUBLICATIONS

Peachey and Matthews; "Downhole Oil/Water Separator Development," Journal of Canadian Petroleum Technology, vol. 33, No. 7, Sep. 1994.

Offshore (Inc. the Oilman), "Downhole Separator Uses Hydrocyclone, Zone Discharge," vol. 55, No. 6, Jun. 1995.

*Primary Examiner*—David A. Reifsnyder
*Attorney, Agent, or Firm*—Fletcher & Associates

[57] ABSTRACT

A fluid separation system is disclosed for installation within a wellbore that penetrates a production formation and a discharge formation. The system comprises a first pump and a second pump each operatively connected to a means for operation, such as a downhole electric motor, and a fluid separator for separating wellbore fluids from the production formation into a first stream and a lighter second stream. Wellbore fluids are introduced into the first pump, and are then conveyed to an inlet of the fluid separator. The second stream exiting the fluid separator is conveyed to an inlet of the second pump, and from the second pump to the earth's surface. Devices are included, such as wellbore packers, to isolate the discharge formation from the production formation, so that the second stream exiting the fluid separator directly enters the discharge formation.

18 Claims, 6 Drawing Sheets

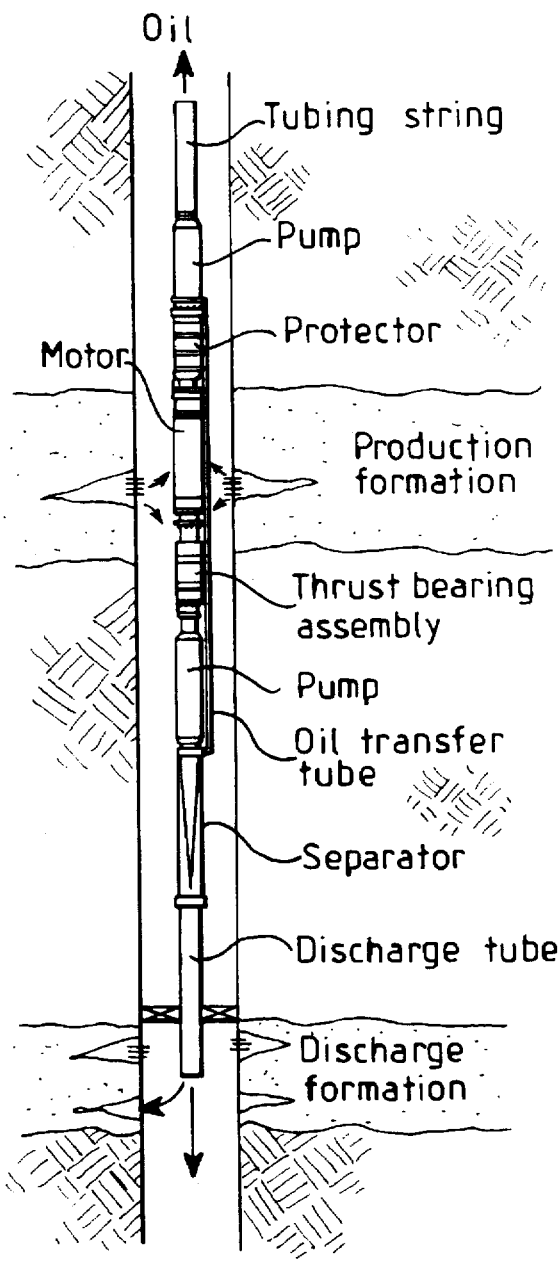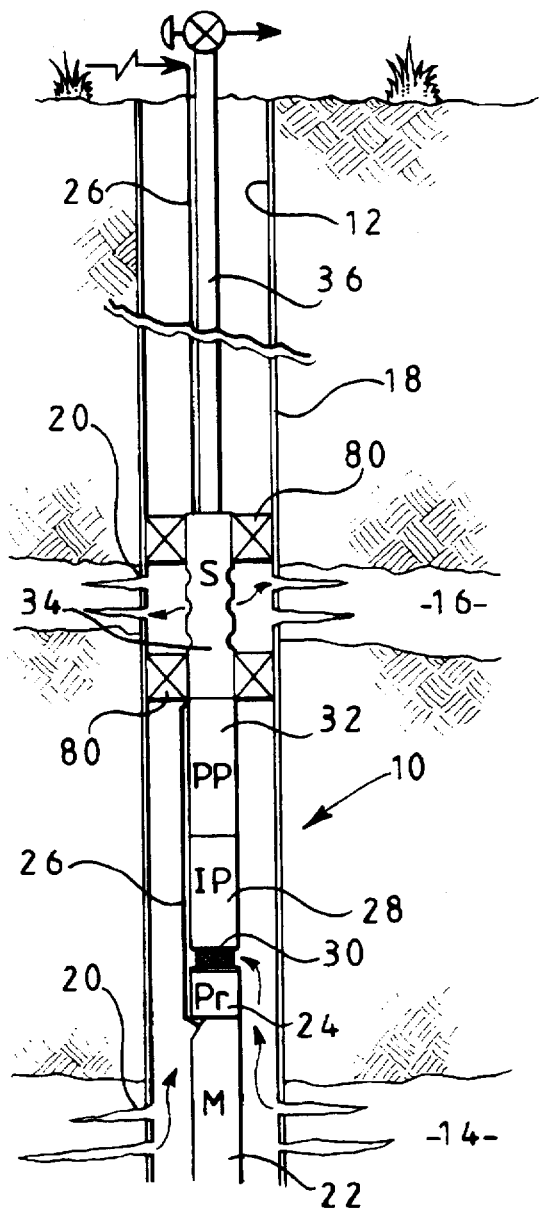

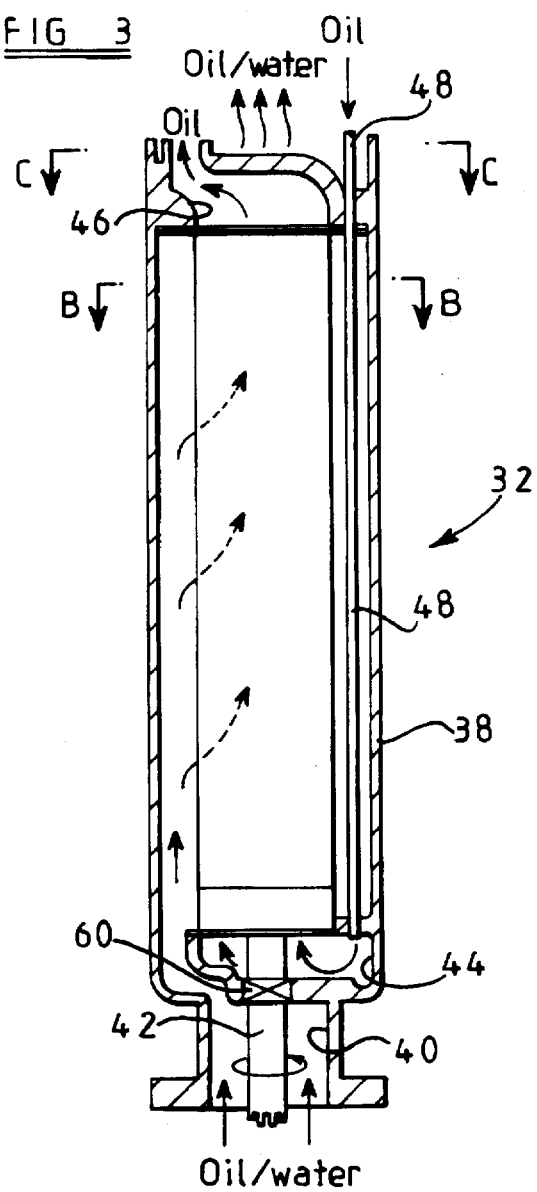
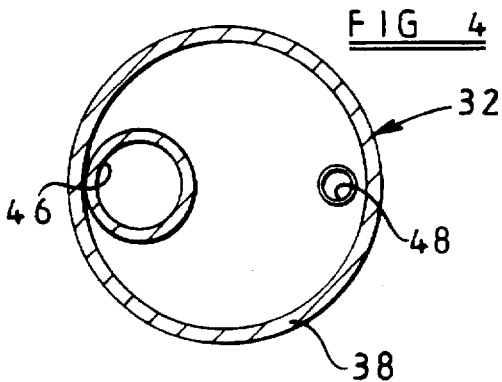
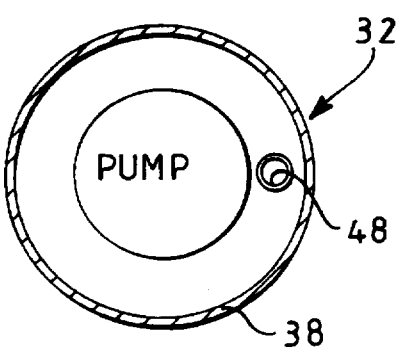
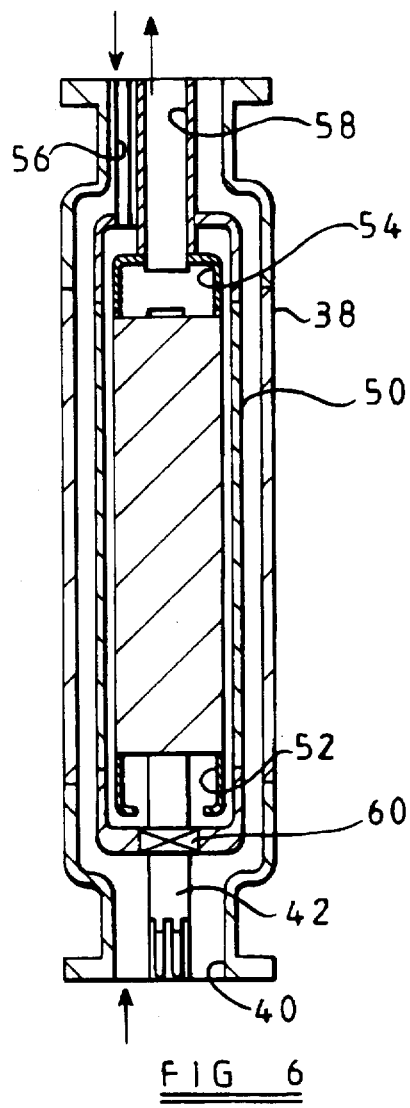

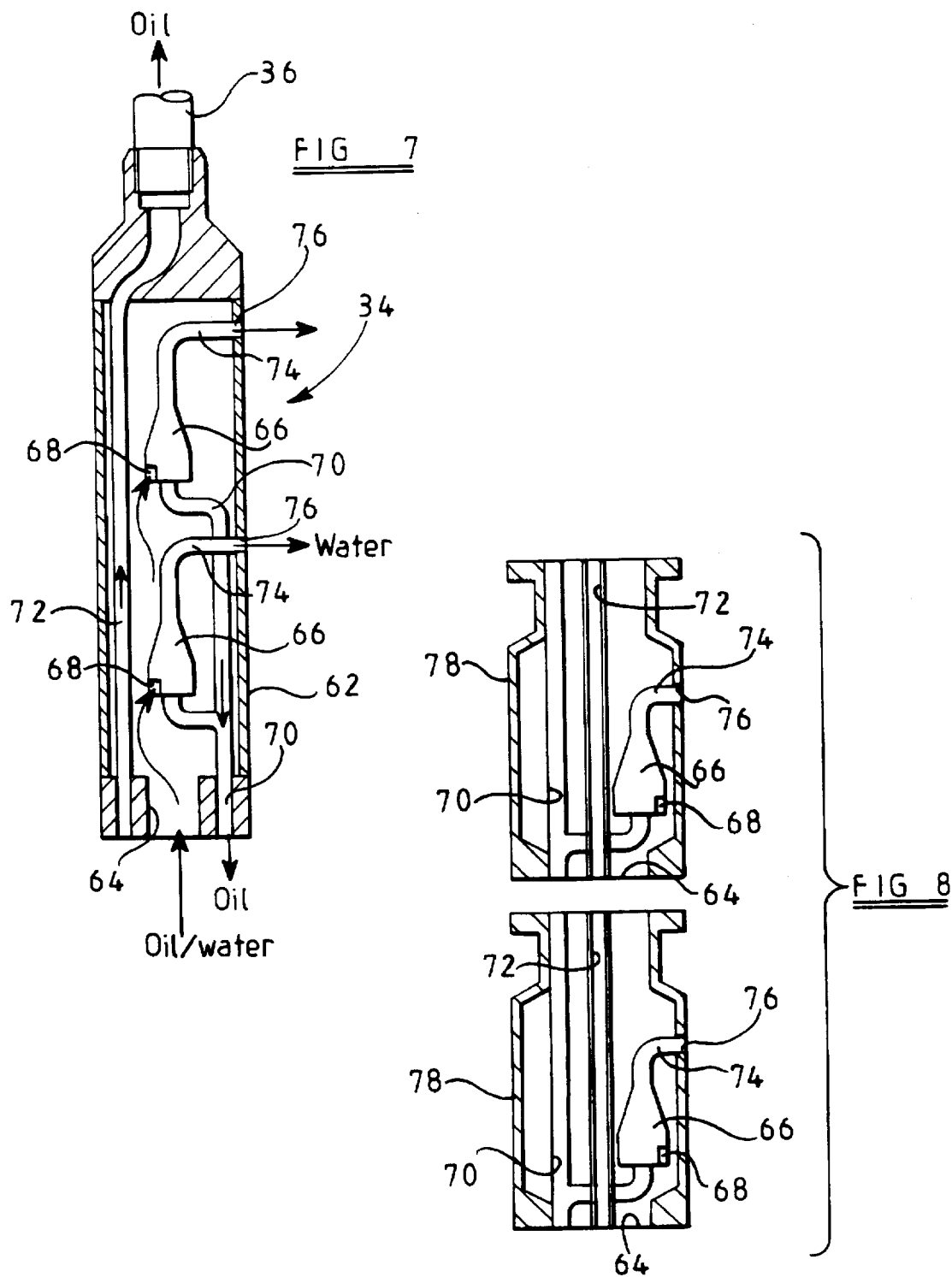

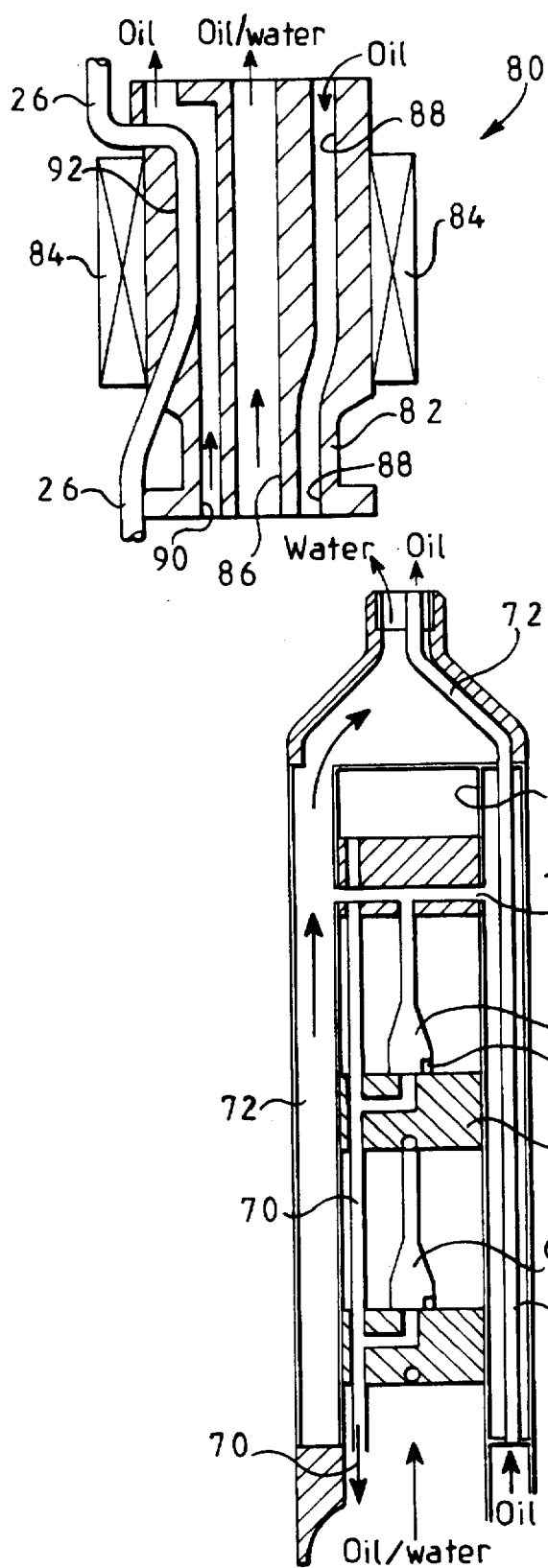
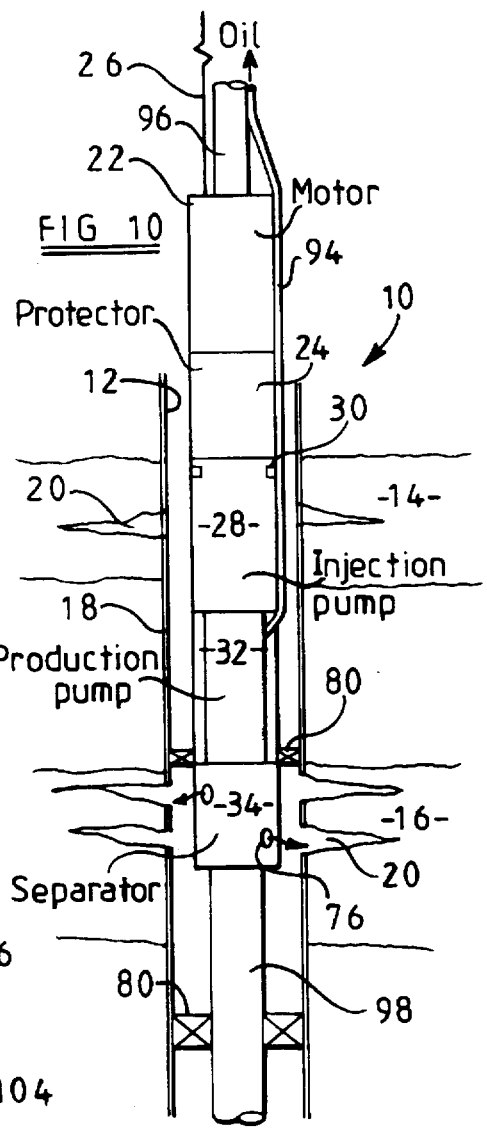

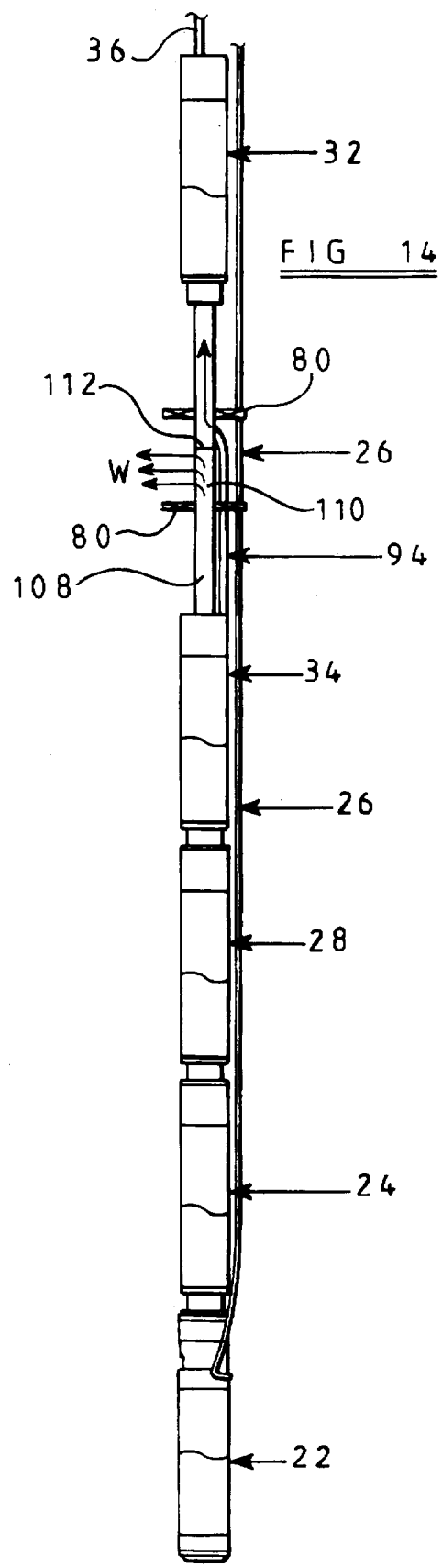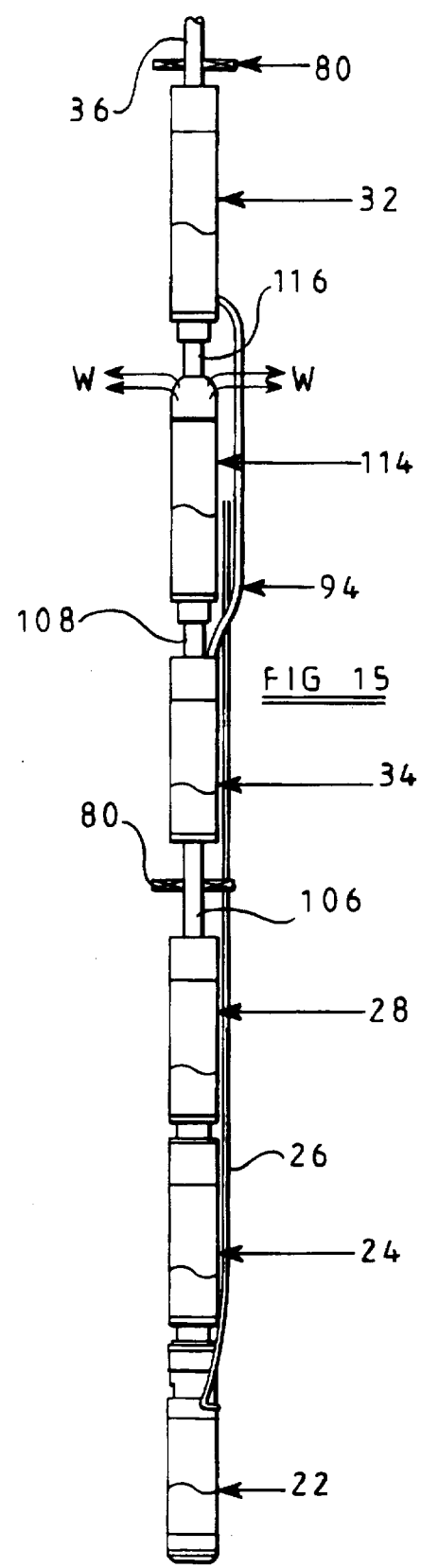

DOWNHOLE FLUID SEPARATION SYSTEM

BACKGROUND OF THE INVENTION

1. Field of the Invention

The present invention relates to a system for the downhole separation of fluids and, more particularly, to such a system that separates oil from water within a wellbore and that disposes of the separated water within the wellbore.

2. Description of Related Art

In many oil fields around the world the percentage of water recovered with oil from subterranean wellbores has risen to be greater than the percentage of the oil. In fact, in many fields, the percentage of oil has decreased to be from about 20% in an excellent field to about 2% in a relatively poor field. Therefore, the operator must lift to the surface and then dispose of the resulting tremendous volume of water. This situation wastes energy because of the power needed to operate pumps to lift and separate the water, and causes an environmental problem. In many locations the separated water cannot be disposed of on the surface, so the water must be transported to a remote well site to be reinjected into a subterranean formation. There is a need for a method and related system for separating the oil from water downhole so that the quantity of water recovered to the earth's surface can be minimized, and hopefully, eliminated.

One method of downhole oil and water separation is disclosed in U.S. Pat. Nos. 5,296,153 and 5,456,837, wherein wellbore fluids are drawn through a hydrocyclone that separates the oil from water. An actual field installation configuration of such a prior system is shown in FIG. 1 hereof. The separated water is then introduced into a first pump to force the water into a subterranean formation, that is isolated from the formation from which the oil and water mixture is recovered from. The separated oil is introduced into a second pump to force the oil to the earth's surface for processing.

A significant disadvantage of the method disclosed in U.S. Pat. No. 5,296,153 is that the oil and water mixture must be drawn through the hydrocyclone and then introduced into a pump. Further, the separated water must exit the separator and be conveyed to a remote location within the wellbore. This arrangement results in a significant loss of fluid head, so the loss in pumping efficiency limits the ability of the system to be used in higher volume wells and results in a waste of energy. There is a need for a method and related system that efficiently separates oil from water within a wellbore, and that efficiently disposes the separated water into subterranean formations.

Additionally, the system disclosed in the '153 Patent presents problems with diametric clearances in wellbores. For example, in a 7 inch diameter casing, it is current practice to install an electric submergible pumping system of 5.62 inches in diameter. The resulting diametric clearance is insufficient to have fluid transfer tubes outside of the exterior profile of the pumping equipment, as is needed when fluids are to be recovered from a lower zone and injected into an upper zone, without using smaller than desired pumping equipment. If the smaller sized equipment is used, the fluid transfer tubes located outside of the pumping equipment are prone to damage when installing or removing the pumping equipment. Further, a problem with the prior hydrocyclone configurations is that a series of complicated and relatively expensive cast manifolds and formed tubing must be used, which significantly add to the cost of the system.

SUMMARY OF THE INVENTION

The present invention has been contemplated to overcome the foregoing deficiencies and meet the above described needs. Specifically, the present invention is a system for separating oil from water within a subterranean wellbore and recovering separated oil to a surface location. The fluid separation system comprises a first pump and a second pump each operatively connected to a means for operation, such as a downhole electric motor, and a fluid separator, such as one or more hydrocyclones, for separating wellbore fluids from the production formation into a first stream (predominately water) and a second stream (predominately oil with a relatively very small percentage of water). Wellbore fluids are introduced into the first pump, and are then conveyed to an inlet of the fluid separator. The second stream exiting the fluid separator is conveyed to an inlet of the second pump, and from the second pump to the earth's surface. Devices are included, such as wellbore packers, to isolate the discharge formation from the production formation, so that the second stream exiting the fluid separator directly enters the discharge formation.

With the system of the present invention the separated water exits the fluid separator and does not need to be conveyed to a remote location within the wellbore. This total system arrangement results in a significant reduction of loss of fluid head and increased pumping efficiencies over prior systems.

BRIEF DESCRIPTION OF THE DRAWINGS

FIG. 1 is a vertical elevational view of a Prior Art fluid separation system.

FIG. 2 is a vertical elevational view of one preferred embodiment of a fluid separation system of the present invention disposed within a wellbore.

FIG. 3 is a vertical section elevational view of one preferred embodiment of a production pump used in the present invention.

FIG. 4 is a view taken along line B—B of FIG. 3.

FIG. 5 is a view taken along line C—C of FIG. 3.

FIG. 6 is a vertical section elevational view of an alternate preferred embodiment of a production pump used in the present invention.

FIG. 7 is a vertical section elevational view of one preferred embodiment of a fluid separator used in the present invention.

FIG. 8 is a vertical section elevational view of one preferred embodiment of a fluid separator used in the present invention.

FIG. 9 is a vertical section elevational view of one preferred embodiment of a packer, having an electrical cable passing therethrough, used in the present invention.

FIG. 10 is a vertical section elevational view of an alternate preferred embodiment of a fluid separation system of the present invention disposed within a wellbore.

FIG. 11 is a vertical section elevational view of an alternate preferred embodiment of a fluid separator used in the present invention.

FIG. 14 is a vertical elevational view of an alternate preferred embodiment of a fluid separation system of the present invention.

FIG. 15 is a vertical elevational view of an alternate preferred embodiment of a fluid separation system of the present invention.

DETAILED DESCRIPTION OF THE PREFERRED EMBODIMENTS

Figure 12:
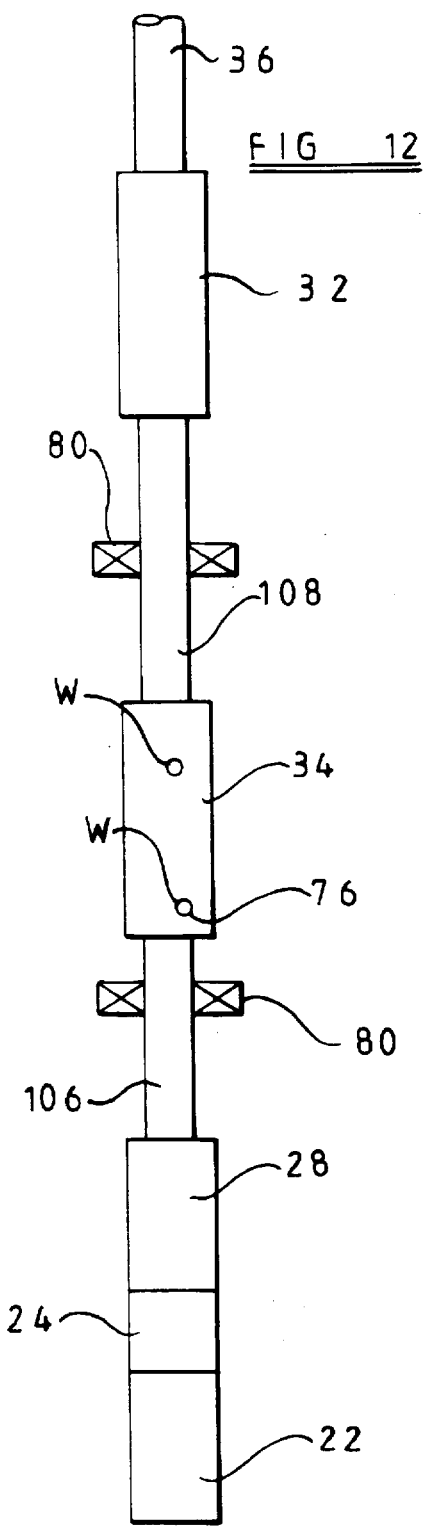
FIG. 12 is a vertical elevational view of an alternate preferred embodiment of a fluid separation system of the present invention disposed within a wellbore.

As briefly described above, the present invention comprises a fluid separation system to be installed within a wellbore that penetrates a production formation and a discharge formation. The production formation can comprise one or more earthen formations that contain fluids, such as oil, condensate, gas, and water. The discharge formation can comprise one or more earthen formations that an operator has chosen to use for the discharge and elimination of fluids that are not to be brought to the earth's surface. The fluid separation system of the present invention can be used in wellbores where the production formation(s) is closer to the earth's surface than the discharge formation(s), and visa-versa. Since, the fluid separation system of the present invention can be used in vertical, inclined and horizontal wellbores, references herein to "above" and "below" are merely for ease of understanding and should not be considered in any way limiting.

One preferred embodiment of the fluid separation system comprises a first pump and a second pump each operatively connected to a means for operation, such as a downhole electric motor, and a fluid separator for separating wellbore fluids from the production formation into a first stream and a lighter second stream. Wellbore fluids are introduced into the first pump, and are then conveyed to an inlet of the fluid separator. The second stream exiting the fluid separator is conveyed to an inlet of the second pump, and from the second pump to the earth's surface. Devices are included, such as wellbore packers, to isolate the discharge formation from the production formation, so that the second stream exiting the fluid separator directly enters the discharge formation.

Referring now to the drawings, FIG. 2 shows one preferred embodiment of a fluid separation system 10 of the present invention installed within a wellbore 12 that penetrates one or more earthen production formations 14 and one or more earthen discharge formations 16. In the configuration shown in FIG. 1 the discharge formation 16 is above (ie. closer to the earth's surface) the production formation 14. A wellbore casing 18 is set within the wellbore 12 and includes a plurality of ports or perforations 20 adjacent the formations 14 and 16 to permit fluid transfer from/to the formations.

The system 10 includes a downhole electric motor 22 connected to an oil-filled motor protector 24, as is well known to those skilled in the art. The motor 22 is operated by electric power supplied from a power source on the earth's surface through a cable 26. A drive shaft (not shown) of the motor 22 extends from the protector 24 and is operatively connected to a first pump 28, which will be referred to as the "injection pump". The injection pump 28 can be a progressive cavity pump, gear, or, most preferably, a multi-staged centrifugal pump. Fluids, such as oil and water, from the production formation 14 are directly drawn into an intake 30 of the injection pump 28, or the fluids can first pass through a stationary or rotating gas separator (not shown), as is well known to those skilled in the art.

A drive shaft (not shown) extends from the injection pump 28 and is operatively connected to a second pump 32, which will be referred to as the "production pump". The production pump 32 can be a progressive cavity pump, gear, or, most preferably, a multi-staged centrifugal pump. The production pump 32 is shown directly connected to the injection pump 28, but it should be understood that the injection pump 28 and the production pump 32 can be spaced from each other yet still be connected by way of a tubular member, or the two pumps may not be connected at all, as all will be described in more detail below. Additionally, the two pumps are shown being operated by a single drive means, ie. the motor 22; however, each pump may be connected to its own separate means of operation, such as separate downhole electric motors, surface drives, and the like, again as all will be described in more detail below.

The purpose of the injection pump 28 is to convey wellbore fluids to a fluid separator 34, that is connected to the production pump 32. Within the fluid separator 34 the fluids are separated into a first stream, such as primarily water, and a lighter/less dense second stream, primarily oil. The separated second stream is to be recovered to the earth's surface, and in most cases there is insufficient energy to lift the second stream fluids to the earth's surface without some form of lifting mechanism. The production pump 32 provides this lift to convey the second stream fluids to the earth's surface through a production jointed or coiled tubing 36.

FIGS. 3, 4 and 5 illustrate one preferred embodiment of the production pump 32. An outer tubular housing 38 of the production pump 32 includes a lower opening 40 for entry of the wellbore fluids being conveyed from the injection pump 28 to the fluid separator 34. Through the lower opening 40 extends a drive shaft 42 of the production pump 32 which is connected to the drive shaft of the injection pump 28 or to its own downhole electric motor or other means of operation. Disposed within the housing 38 is the gear, progressive cavity or centrifugal pump unit itself, with the fluid intake of this pump being in communication with a sealed lower chamber 44 formed inside the housing 38, and with the fluid outlet of this pump being in communication with a sealed upper chamber 46 formed inside the housing 38. A conduit 48 extends through the housing 38 and into the sealed lower chamber 44. The second stream fluids, primarily oil, are conveyed from the fluid separator 34 through the conduit 48 to the production pump's intake. The second stream fluids are then discharged from the production pump into the upper chamber 46, past the fluid separator 34 to the production tubing 36. While it is preferred that the conduit 48 be contained within the housing 38, it should be understood that one or more conduits can be located exterior of the housing 38, or even within the production pump itself. Such exterior tubes can be of the type disclosed within copending U.S. patent application Ser. No. 08/532,465, filed Sep. 22, 1995, now abandoned, which is commonly assigned hereto.

An alternate embodiment of the production pump 32 is shown in FIG. 6 wherein the outer tubular housing 38 of the production pump 32 includes the lower opening 40 for entry of the wellbore fluids being conveyed from the injection pump 28 to the fluid separator 34. Through the lower opening 40 extends the drive shaft 42 of the production pump 32 which, as described above, is connected to the drive shaft of the injection pump 28 or to its own downhole electric motor or other means of operation. Disposed within the housing 38 is the progressive cavity or centrifugal pump unit itself disposed within another housing 50. The fluid intake of this pump is in communication with a non-sealed lower chamber 52 formed within the second housing 50, and with the fluid outlet of this pump being in communication with a sealed upper chamber 54 formed in the second housing 50. A conduit 56 extends through the housing 38 and into communication with the interior of the second housing 50, as well as this pump's intake. The second stream fluids, primarily oil, are conveyed from the fluid separator 34 through the conduit 56 to the production pump's intake. The second stream fluids are then discharged from the production pump into the upper chamber 54, through a conduit 58 and to the production tubing 36.

One of the benefits of the configuration of the production pumps 32 shown in FIGS. 3 and 6 is that a lower shaft seal 60 can be made from relatively inexpensive material since it is not exposed to as high of pressure as the shaft seals currently used in the prior system shown in FIG. 1.

The wellbore fluids exiting the injection pump 28 are conveyed to the fluid separator 34 wherein the fluids are separated into a first stream and a second less dense stream. The means for accomplishing this fluid density separation can be one or more filters, membranes, electrostatic devices, rotary vane separators, static or moving centrifugal separators, or any combination of these devices. For reasons of low cost and ruggedness, the fluid streams are most preferably separated by one or more hydrocyclones.

FIG. 7 illustrates one preferred embodiment of the fluid separator 34, wherein a generally tubular housing 62 has a lower opening 64 through which flows the wellbore fluids exiting the injection pump 28. Disposed within the housing 62 are one or more hydrocyclones 66 in a generally tandem or longitudinally aligned relationship. The orientation of the hydrocyclones 66 is not considered important for functionality reasons, but the orientation is important for fitting the appropriate sized hydrocyclones and associated plumbing within the space confines of the housing 62. The hydrocyclones 66 can be longitudinally aligned, helically arranged, radially arranged, nose-to-tail, or any other suitable arrangement or combination as is desired.

The wellbore fluids pass from the injection pump 28, through the lower opening 64 and into the interior of the housing 62, and enter a tangential inlet opening 68 in each hydrocyclone 66. The fluids spin upon entering the interior of the hydrocyclone, and thereby are separated into the first stream and the second less dense stream. The second stream, being primarily oil, exits each hydrocyclone 66 through a central opening (not shown) and enters a conduit 70 that conveys the collected second stream to the production pump 32. The second stream that exits the production pump 32 is conveyed to the tubing 36 through a conduit 72. The conduits 70 and 72 can be located within the interior of the housing 62, as shown in FIG. 7, or conduit 70 and/or 72 can be located outside of the housing 62, as is desired.

An important feature of this preferred embodiment of the present invention is that the separated first stream, being primarily water, does not need to be transported through a separate conduit to a remote location, but directly exits the fluid separator 34 and is thereby introduced into the wellbore adjacent the discharge formation 16. The second stream exits each hydrocyclone 66 through a tail cone opening (not shown) and enters a conduit 74 that extends to openings 76 in side wall of the housing 62. The openings 76 can be radially, linearly, helically or randomly arranged about the housing 62, as is desired. Further, the conduits 74 can include check valves to prevent fluids within the wellbore or fluids from the discharge formation 16 from entering the hydrocyclones 66.

FIG. 8 illustrates an alternate embodiment of the fluid separator 34 wherein one or more hydrocyclones 66 are included within a separate housing 78, which in mm are modular in design so that any number of housings 78 can be stacked or connected together to provide the fluid separation volume desired.

Wellbore isolation or sealing devices are used to prevent the second stream that exits the fluid separator 34 from reentering the injection pump 28. These wellbore isolation or sealing devices are commonly referred to as wellbore packers 80 (as shown in FIG. 2), and are located in at least one location between the production formation 14 and the discharge formation 16. Usually, two sets of packers 80 will be used to isolate the discharge formation 16. The packers 80 can be as suitable commercially available retrievable or permanent packers with inflatable or compressible elastomeric sealing elements, as is well known to those skilled in the art. The packers 80 can be included on the exterior of the fluid separator 34, the production pump 32, the injection pump 28, the motor protector 24, the motor 22, or preferable on separate housings that are interconnected into the system 10, such as between the fluid separator 34 and/or the production pump 32, or on the tubing string 36.

One preferred embodiment of a wellbore packer 80 for use in the system 10 is shown in FIG. 9 wherein a generally tubular housing or mandrel 82 has one or more elastomeric sealing elements 84 annularly disposed on an exterior surface thereof. The mechanisms for setting the packer elements 84 are not shown, but are well known to those skilled in the art. The housing 82 includes four separate passageways or conduits that pass therethrough. A central passage 86 extends through the housing 82 and is used to convey wellbore fluids from the injection pump 28 to the fluid separator 34. A conduit 88 extends through the housing 82 and is used to convey the separated second stream from the fluid separator 34 to the production pump 32. Another conduit 90 extends through the housing 82 and is used to convey the second stream from the production pump 32 to the tubing 36. A fourth passage 92 curves through a side wall of the housing 82 to and from either side of the packer elements 84. The electrical cable 26 for the motor 22 extends through this passage 92 so that more complex sealing mechanisms are not needed to seal around the cable 26 if such cable 26 extended along the exterior of the items of equipment within the wellbore zone isolated by the packers 80.

FIG. 10 illustrates an alternate preferred embodiment of the fluid recovery system 10 wherein the system 10 is mined upside down as compared to the orientation of FIG. 2. In FIG. 10 the production formation is above (ie. closer to the earth's surface) the discharge formation 16, so that the separated second stream exits the production pump 32 into a oil recovery conduit 94. The conduit 94 can pass interiorly of the injection pump 28 or preferably on the outside thereof and is then strapped to the outside of a jointed or coiled tubing string 96 that extends to the earth's surface or it can be landed into the interior of the tubing 96 so that the second stream is transferred to the earth's surface through the tubing 96. The separated first stream, being primarily water, is discharged from openings 76 in the fluid separator 34 and then into the isolated discharge formation 16. If the discharge formation 16 has insufficient capacity to receive the injected first stream, then a discharge tubing 98 can be extended from the fluid separator 34 to convey all or a portion of the separated first stream to a remote discharge formation. The system of FIG. 10 can be modified to have only a single packer 80 on the tubing string 36 with all of the system above the packer 80 for a discharge of waste water downwardly into a lower discharge formation 16 through the discharge tubing 98. Alternatively, the system of FIG. 10 can be mined upside down with a single packer 80 on the tubing string 36 with all of the system above the packer 80 for a discharge of the second stream upwardly through an interior or exterior conduit.

FIG. 11 illustrates an alternate preferred embodiment of the modular fluid separator 34 for use with one of the above described systems. In this embodiment the hydrocyclones 66 are contained within an inner housing 100 that has a series of openings 102 in the side wall thereof for discharge of the first stream, as well as opening for the collection and conveying of the second stream being formed into molded or forged manifolds 104. Each manifold 104 has annular sealing means (not shown) on an exterior surface thereof so that each hydrocyclone 66 will be separated as a modular unit. In this embodiment, the waste water or first stream is shown being conveyed upwardly for discharge (such as shown in FIGS. 14 and 15), and the second stream is shown being conveyed downwardly to a lower production pump. However, it should be understood that the first stream can be discharged into a discharge formation directly from the housing of the separator 34 or appropriate tubing can be included for the first stream to be conveyed to a lower discharge location.

FIG. 12 illustrates an alternate preferred embodiment of the fluid separation system 10 of the present invention. In this embodiment the wellbore fluids enter the injection pump 28 and are conveyed to the fluid separator 34, that is spaced therefrom by a tubular member 106. The second stream that exits the fluid separator 34 passes to the production pump 32, that is spaced therefrom by a tubular member 108. The packers 80 are located on the tubular members 106 and 108, with the electric cable 26 passing interiorly thereof. The production pump 32 can be driven by the motor 22 by a shaft that extends from the injection pump 28, through the tubular member 106, the fluid separator 34 and the tubular member 108. Preferably, the production pump 32 in this embodiment is driven by a second separate means of operation, such as an electric motor (not shown) located above or below the production pump 32, or by a surface drive means, such as a rotating shaft or a sucker rod string if the production pump 32 is a traveling valve pump.

Figure 13:
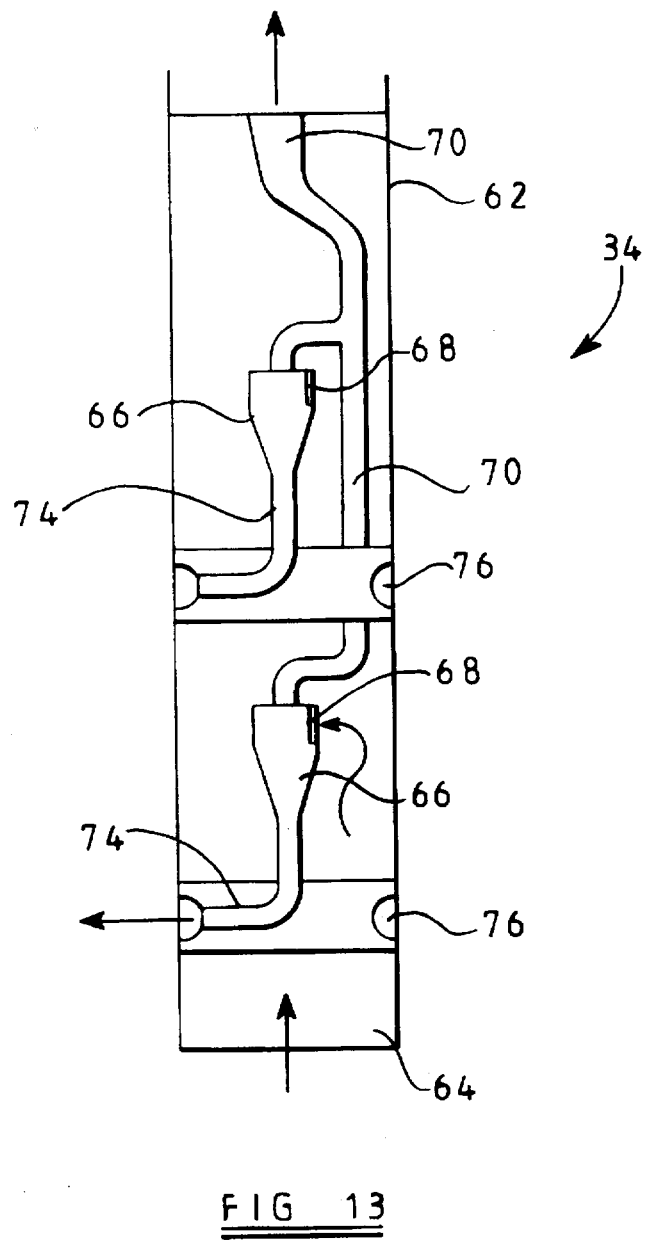
FIG. 13 is a vertical section elevational view of an alternate preferred embodiment of a fluid separator used in the present invention.

With the embodiment shown in FIG. 12 the fluid separator 34 can be of the type shown in FIG. 13 wherein the separated second stream is to be passed directly upwardly to the spaced production pump 32, so the conduit 70 passes upwardly rather than downwardly and there is no need for the conduit 72 to bring the second stream back through the fluid separator 34 to the tubing 36.

FIG. 14 illustrates an allternate embodiment of the fluid separatation system 10 of the present invention similar to the embodiment shown in FIG. 12. This embodiment is useful where the fluid separator 34 cannot be located directly adjacent to the discharge formation. In this embodiment the separated second stream exits the fluid separator 34 and passes into the oil recovery conduit 94. The conduit 94 inturn passes either interiorly or exteriorally of the packers 80, and then into the interior of the tubular member 108 for passage to the spaced production pump 32. Additionally, the separated first stream exits the fluid separator 34 through the tubular member 108, which has openings 110 therein below an interior seal 112 to permit the second stream to enter the isolated wellbore adjacent a discharge formation.

FIG. 15 illustrates another alternative preferred embodiment of the fluid separation system 10 of the present invention. This embodiment is similar to the embodiments of FIGS. 12 and 14; however, the separated first stream that exits the fluid separator 34 is conveyed through the tubular member 108 to a hydraulic motor 114, which is a turbine, bladed, centrifugal, gear or progressive cavity motor that is rotated by the flow of the first stream therethrough, as is well known to those skilled in the art. If the hydraulic motor 114 is disposed adjacent to the discharge formation, then the first stream after it exits the hydraulic motor 114 can be directly introduced into the isolated section of the wellbore and into the discharge formation. A drive shaft (not shown) extends from the hydraulic motor 114 and passes through a tubular member 116, and in turn is operatively connected to the production pump 32. The separated second stream is conveyed via the conduit 94 to the production pump 32 and then through the tubing 36 to the earth's surface.

As can be appreciated by those skilled in the art, with the system of the present invention the separated water exits the fluid separator and does not necessarily need to be conveyed to a remote location within the wellbore. This total system arrangement results in a significant reduction of loss of fluid head and increased pumping efficiencies over prior systems.

Wherein the present invention has been described in particular relation to the drawings attached hereto, it should be understood that other and further modifications, apart from those shown or suggested herein, may be made within the scope and spirit of the present invention.

What is claimed is:

1. A fluid separation system for installation within a wellbore that penetrates a production formation and a discharge formation, comprising:

a first pump and a second pump each operatively connected to a means for operation;

a fluid separator for separating wellbore fluids from the production formation into a first stream and a lighter second stream;

means for conveying wellbore fluids exiting the first pump to an inlet of the fluid separator;

means for conveying the second stream exiting the fluid separator to an inlet of the second pump;

means for conveying the second stream exiting the second pump to the earth's surface;

means for fluidically isolating the discharge formation to create a discharge zone within the wellbore that is fluidically isolated from the production formation; and wherein the fluid separator includes means for causing the first stream exiting the fluid separator to directly enter the discharge formation without passing through a discharge conduit.

2. A fluid separation system of claim 1 wherein the means for operation connected to the first pump comprises a downhole electric motor.

3. A fluid separation system of claim 2 wherein the means for operation connected to the second pump comprises a downhole electric motor.

4. A fluid separation system of claim 2 wherein the downhole electric motor is operatively connected to the first pump and to the second pump.

5. A fluid separation system of claim 2 wherein the fluid separator is connected to the second pump, which is connected to the electric motor, which in turn is connected to the first pump.

6. A fluid separation system of claim 2 wherein the fluid separator is connected to the second pump, which is connected to the first pump, which in turn is connected to the electric motor.

7. A fluid separation system of claim 2 wherein the second pump is connected to the fluid separator, which is connected to the first pump, which in turn is connected to the electric motor.

8. A fluid separation system of claim 1 wherein the first pump is directly connected to the second pump.

9. A fluid separation system of claim 1 wherein the second pump is spaced from the first pump by means of a tubular member.

10. A fluid separation system of claim 1 wherein the second pump is contained within a housing with wellbore fluids entering the housing and flowing past the second pump, and including therewithin the means to convey the second stream exiting the fluid separator to the inlet of the second pump.

11. A fluid separation system of claim 10 wherein the means to convey the second stream exiting the fluid separator to the inlet of the second pump comprises a conduit.

12. A fluid separation system of claim 1 wherein the fluid separator comprises one or more hydrocyclones.

13. A fluid separation system of claim 12 wherein the fluid separator comprises a generally tubular housing containing a plurality of hydrocyclones in generally longitudinal relationship.

14. A fluid separation system of claim 12 wherein the fluid separator comprises a generally tubular housing with the one or more hydrocyclones contained therein, the housing having a generally open first end for admitting wellbore fluids into an interior of the housing; and further comprising an inlet of each hydrocyclone being in communication with the interior of the housing, piping connected to a second stream outlet of each hydrocyclone to collect the second stream exiting each hydrocyclone and to convey the second stream to an inlet of the second pump, and piping connected to a first stream outlet of each hydrocyclone to collect the first stream exiting each hydrocyclone and to convey the first stream to one or more fluid exit openings in the housing.

15. A fluid separation system of claim 1 wherein both the first pump and the second pump comprise multi-staged centrifugal pumps.

16. A fluid separation system of claim 1 wherein the first pump is a multi-staged centrifugal pump.

17. A fluid separation system of claim 16 wherein the second pump comprises a positive displacement pump.

18. A fluid separation system of claim 16 wherein the second pump comprises a traveling valve pump.

* * * * *